(12) United States Patent
Huang et al.

(10) Patent No.: US 11,566,348 B2
(45) Date of Patent: Jan. 31, 2023

(54) METHOD OF PREPARING PLANT-BASED FUNCTIONAL POLYESTER FILAMENT

(71) Applicant: BESTEE MATERIAL (TSINGTAO) CO., LTD., Qingdao (CN)

(72) Inventors: Xiaohua Huang, Qingdao (CN); Yanming Liu, Qingdao (CN); Yu Liu, Qingdao (CN); Xiaoqian Huang, Qingdao (CN); Li Zhen, Qingdao (CN); Jie Liu, Qingdao (CN)

(73) Assignee: BESTEE MATERIAL (TSINGTAO) CO., LTD., Qingdao (CN)

( * ) Notice: Subject to any disclaimer, the term of this patent is extended or adjusted under 35 U.S.C. 154(b) by 104 days.

(21) Appl. No.: 17/076,481

(22) Filed: Oct. 21, 2020

(65) Prior Publication Data

US 2021/0130986 A1 May 6, 2021

(30) Foreign Application Priority Data

Nov. 6, 2019 (CN) .......................... 201911076259.3

(51) Int. Cl.

| | | |
|---|---|---|
| C08J 3/22 | (2006.01) | |
| C08K 3/01 | (2018.01) | |
| C08K 3/013 | (2018.01) | |
| C08K 3/015 | (2018.01) | |
| C08K 3/28 | (2006.01) | |
| C08K 5/08 | (2006.01) | |
| C08K 5/17 | (2006.01) | |
| D01D 1/04 | (2006.01) | |
| D01D 5/08 | (2006.01) | |
| D01F 1/10 | (2006.01) | |
| D01F 6/62 | (2006.01) | |
| D01F 6/92 | (2006.01) | |
| C08H 7/00 | (2011.01) | |
| D01F 11/08 | (2006.01) | |
| C08K 5/5419 | (2006.01) | |
| B29B 9/06 | (2006.01) | |
| C08K 3/32 | (2006.01) | |
| C08K 3/08 | (2006.01) | |

(52) U.S. Cl.
CPC ............... *D01F 6/92* (2013.01); *B29B 9/065* (2013.01); *C08H 6/00* (2013.01); *C08K 5/175* (2013.01); *C08K 5/5419* (2013.01); *D01F 1/103* (2013.01); *D01F 11/08* (2013.01); *C08K 2003/0893* (2013.01); *C08K 2003/324* (2013.01); *C08K 2201/011* (2013.01); *D10B 2331/04* (2013.01); *D10B 2401/13* (2013.01)

(58) Field of Classification Search
CPC .............. B29B 9/06; B29B 9/065; C08J 3/22; C08K 3/01; C08K 3/013; C08K 3/015; C08K 2003/0893; C08K 3/28; C08K 2003/324; C08K 5/0058; C08K 5/08; C08K 5/17; C08K 5/175; C08K 5/5419; C08K 2201/011; D01D 1/04; D01D 5/08; D01F 1/10; D01F 1/103; D01F 6/62; D10B 2331/04; D10B 2401/13
USPC .......... 264/103, 141, 142, 143, 211, 331.21; 424/725, 733, 740, 747; 523/218, 351; 524/27, 35, 47, 58, 210, 242, 250, 252, 524/261, 267, 417, 439, 495, 496
See application file for complete search history.

(56) References Cited

U.S. PATENT DOCUMENTS 5,207,959 A * 5/1993 Antikow .................. D01F 6/62
                                                       264/103 X
2008/0226584 A1* 9/2008 Krishnan ............... D21H 21/36
                                                       524/439 X

FOREIGN PATENT DOCUMENTS

| CN | 104674454 A | * | 6/2015 | ............... D01D 5/08 |
| CN | 109135208 A | * | 1/2019 | ..... C08K 2003/0893 |

OTHER PUBLICATIONS

Translation of CN 104674454 A (published on Jun. 3, 2015).*
Translation of CN 109135208 A (published on Jan. 4, 2019).*

* cited by examiner

*Primary Examiner* — Leo B Tentoni
(74) *Attorney, Agent, or Firm* — Anova Law Group, PLLC

(57) ABSTRACT

A plant-based functional polyester filament and a preparation method of the plant-based functional polyester filament are provided. The plant-based functional polyester filament includes polyester, and plant extract in a weight percentage range of approximately 0.1%-1.5%. The plant extract includes one or more of a peppermint extract, a valerian extract, a lavender extract, a wormwood extract, a chitin extract and a seaweed extract. The method includes preparing a plant-based functional polyester masterbatch, including: heating polyethylene terephthalate (PET) chips to a molten state, adding an antioxidant and a dispersant to the molten PET, stirring the molten PET, adding a protective agent and a plant extract to the molten PET, stirring the molten PET at a high speed, adding a modifier to the molten PET, obtaining a mixture by uniformly mixing the molten PET, and performing an extrusion granulation process on the mixture.

19 Claims, No Drawings

METHOD OF PREPARING PLANT-BASED FUNCTIONAL POLYESTER FILAMENT

CROSS-REFERENCE TO RELATED APPLICATION

This application claims the priority of Chinese patent application No. 201911076259.3, filed on Nov. 6, 2019, the entirety of which is incorporated herein by reference.

FIELD OF THE DISCLOSURE

The present disclosure generally relates to the field of textile technology and, more particularly, relates to a plant-based functional polyester filament and a preparation method thereof.

BACKGROUND

As an important type of synthetic fiber, polyester fiber accounts for more than 60% of the world's synthetic fiber production. The polyester fiber is featured with advantages such as durability, desired elasticity, deformation-resistance, corrosion-resistance and insulation, and more particularly, desired wrinkle-resistance and shape retention. Polyester fabric is washable, wear-resistant, non-iron and wrinkle-resistance, and has been widely used in outerwear, home textile, luggage and tent, etc.

Polyester fiber containing a plant extract theoretically has both function of the plant extract and property of polyester fiber, and has a wide range of application prospects. However, the following problems exist in actual production.

First, when being mixed with any other functional material, original properties of the polyester fiber tend to be changed. For example, the elasticity and wear-resistance, etc., of the polyester fiber are affected. Second, the compatibility between various functional materials is poor. In an existing method, the plant extracts are directly added to molten polyethylene terephthalate (PET). The plant extracts tend to agglomerate and are unevenly dispersed in the molten PET, and are easily oxidized at a high temperature. Third, the existing plant-based functional polyester masterbatch has poor peelability during the spinning process. Because the PET melt with plant extract tends to produce expansion region after being extruded from the spinner, the expansion region affects the shape of the melt leaving the spinning hole, and a sticking-to-plate phenomenon tends to occur, which affects the normal production of the spinning process.

In addition, as a type of artificial synthetic fiber, polyester fiber has shortcomings. For example, after being used for a period of time, the fabric made of polyester fiber tends to be pilled and charged with static electricity, and tends to stick dust, which affects the appearance and comfort. However, in the existing technology, the shortcomings of the polyester fiber do not be well improved, which affects the application of polyester fiber.

For example, Chinese patent publication No. CN109487360A discloses a polyester fiber containing a plant extract. The polyester fiber has a desired natural functionality, high dry heat shrinkage, high breaking strength, high elastic elongation, greatly improved wear-resistance, non-toxic, non-flammable, safety and environmental protection. Such patent mainly solves the problem of poor mechanical strength of the plant-based functional polyester fiber, and cannot solve the shortcomings of the existing polyester fiber such as easy-pilling, carrying static electricity and dust-sticking.

Based on the above reasons, it is of great significance to prepare a polyester fiber with desired plant functionality, antibacterial deodorization, desired wear-resistance, high elasticity, comfortable hand feeling, non-pilling and non-dust-sticking. The disclosed methods and polyester fiber are directed to solve one or more problems set forth above and other problems.

BRIEF SUMMARY OF THE DISCLOSURE

One aspect of the present disclosure provides a plant-based functional polyester filament. The plant-based functional polyester filament includes polyester, and plant extract in a weight percentage range of approximately 0.1%-1.5%. The plant extract includes one or more of a peppermint extract, a valerian extract, a lavender extract, a wormwood extract, a chitin extract and a seaweed extract.

In one embodiment, breaking strength is in a range of approximately 6.8 cN/dtex-7.8 cN/dtex, elastic modulus is in a range of approximately 90 cN/dtex-101 cN/dtex, and elongation at break is in a range of approximately 12%-18%.

In one embodiment, 2000-times wear loss is less than 0.001 g.

In one embodiment, a mite removal rate is greater than 90%, and antibacterial rates of *Escherichia coli* and *Staphylococcus aureus* are greater than 98%.

Another aspect of the present disclosure provides a method for preparing a plant-based functional polyester filament. The method includes preparing a plant-based functional polyester masterbatch, including: heating polyethylene terephthalate (PET) chips to a molten state, adding an antioxidant and a dispersant to the molten PET, stirring the molten PET, adding a protective agent and a plant extract to the molten PET, stirring the molten PET at a high speed, adding a modifier to the molten PET, obtaining a mixture by uniformly mixing the molten PET, and performing an extrusion granulation process on the mixture.

In one embodiment, a mass ratio of the PET chips, the antioxidant, the dispersant, the protective agent, the plant extract and the modifier is approximately 100:(0.1-0.5):(0.1-0.3):(0.4-0.8):(0.5-5):(0.1-0.4).

In one embodiment, the PET chips are heated to a temperature of approximately 250° C.-260° C., the antioxidant and dispersant are added to the molten PET, and then the molten PET is stirred at a speed of approximately 500 rad/min-700 rad/min for approximately 10 minutes-15 minutes, the protective agent and plant extract are added to the molten PET, and then the molten PET is stirred at a high speed for approximately 20 minutes-40 minutes, the modifier is added to the molten PET, and then the molten PET is stirred to obtain a mixture and cooled to a temperature of approximately 220° C.-230° C., and the extrusion granulation process is performed on the mixture to obtain the plant-based functional polyester masterbatch.

In one embodiment, the antioxidant includes tert-butyl hydroquinone and zinc powder in a mass ratio of approximately 1:(2-5).

In one embodiment, the dispersant includes sodium tripolyphosphate, ethylenediaminetetraacetic acid and sodium pyrophosphate in a mass ratio of approximately 1:(1-4):(2-4).

In one embodiment, the protective agent includes nano-carbon powder and cross-linked chitosan porous microspheres in a mass ratio of approximately 1:(1-4).

In one embodiment, forming the cross-linked chitosan porous microspheres includes: dissolving chitosan in an acetic acid solution with a mass concentration of approximately 2%-5%, and removing bubbles by standing still to obtain a uniform and transparent chitosan solution. A mass ratio of the chitosan and the acetic acid solution is approximately 1:(95-100). The method also includes adding an emulsifier to liquid paraffin and nano-silica, and obtaining an emulsified dispersant by fully stirring. A mass ratio of the liquid paraffin, the nano-silica and the emulsifier is approximately (50-60):(2-5): 1. Further, the method includes under stirring condition, dropwise adding the chitosan solution to the emulsified dispersant, heating to a temperature of approximately 40° C.-50° C., after being uniformly mixed adding formaldehyde, adjusting a pH value of a reaction system to be approximately 4-5, and maintaining at a reaction temperature for approximately 2 hours-3 hours, after the reaction ends, water-washing the product, soaking the product with 20%-30% sodium hydroxide solution, and water-washing the product to obtain the cross-linked chitosan porous microspheres. A mass ratio of the chitosan solution, the emulsified dispersant and the formaldehyde is approximately 100:(50-55):(4-8).

In one embodiment, the modifier includes ethylene bis-stearamide and silicone oil in a mass ratio of approximately 1:(3-5).

In one embodiment, the method further includes uniformly mixing the PET chips and the plant-based functional polyester masterbatch, melting the PET chips and plant-based functional polyester masterbatch by a screw extrusion, and extruding the melt from a spinning nozzle to obtain the plant-based functional polyester filament.

In one embodiment, a mass ratio of the PET chips and the plant-based functional polyester masterbatch is in a range of approximately (2-50): 1.

In one embodiment, a diameter of the spinning nozzle is approximately 5 μm-50 μm.

In one embodiment, breaking strength of the plant-based functional polyester filament is in a range of approximately 6.8 cN/dtex-7.8 cN/dtex, elastic modulus of the plant-based functional polyester filament is in a range of approximately 90 cN/dtex-101 cN/dtex, and elongation at break of the plant-based functional polyester filament is in a range of approximately 12%-18%.

In one embodiment, 2000-times wear loss of the plant-based functional polyester filament is less than 0.001 g.

In one embodiment, a mite removal rate of the plant-based functional polyester filament is greater than 90%, and antibacterial rates of *Escherichia coli* and *Staphylococcus aureus* of the plant-based functional polyester filament are greater than 98%.

In one embodiment, the plant extract includes one or more of a peppermint extract, a valerian extract, a lavender extract, a wormwood extract, a chitin extract and a seaweed extract.

Other aspects of the present disclosure can be understood by those skilled in the art in light of the description, the claims, and the drawings of the present disclosure.

DETAILED DESCRIPTION

The present disclosure provides a plant-based functional polyester filament and a preparation method of the plant-based functional polyester filament. The plant-based functional polyester filament may contain a plant extract in a weight percentage range of approximately 0.1-1.5%. The plant extract may be an impurity for polyester fiber. If the content of the plant extract is too high, during the preparation process, the plant extract may have substantially poor dispersibility and tend to agglomerate. Moreover, a melt containing impurities may have poor peelability and tend to stick to the spinneret, which affects the spinning.

The plant extract may include one or more of a peppermint extract, a valerian extract, a lavender extract, a wormwood extract, a chitin extract and a seaweed extract. In certain embodiments, the plant extract may include any other suitable plant extract, which may not be described herein.

The present disclosure may also provide a preparation method of the plant-based functional polyester filament. The method may include following steps.

Step 1: preparation of a plant-based functional polyester masterbatch. PET chips may be heated to a temperature of approximately 250° C.-260° C. Antioxidant and dispersant may be added to the molten PET, and then the molten PET may be stirred at a speed of approximately 500 rad/min-700 rad/min for approximately 10 minutes-15 minutes. Protective agent and plant extract may then be added to the molten PET, and then the molten PET may be stirred at a high speed for approximately 20 minutes-40 minutes. Modifier may be added to the molten PET, and then the molten PET may be stirred to obtain a mixture and cooled to a temperature of approximately 220° C.-230° C. Ultimately, an extrusion granulation process may be performed on the mixture to obtain the plant-based functional polyester masterbatch.

A mass ratio of the PET chips, antioxidant, dispersant, protective agent, plant extract and modifier may be approximately 100:(0.1-0.5):(0.1-0.3):(0.4-0.8):(0.5-5):(0.1-0.4).

The plant extract may include one or more of a peppermint extract, a valerian extract, a lavender extract, a wormwood extract, and a seaweed extract. The plant extract may be purchased or self-extracted. The extraction method may include water extraction, acid extraction, or alcohol extraction.

The antioxidant may include tert-butyl hydroquinone and zinc powder in a mass ratio of approximately 1:(2-5). The antioxidant may be configured to prevent the plant extract from changing color when being added to the melt at a high-temperature. The antioxidant may be added in an initial stage, which may make the molten PET fiber have substantially strong oxidation-resistance. When the plant extract is added in a later stage, the plant extract may be effectively prevented from changing color at a high temperature, and the occurrence of coloring may be prevented.

The dispersant may include sodium tripolyphosphate, ethylenediaminetetraacetic acid and sodium pyrophosphate in a mass ratio of approximately 1:(1-4):(2-4). The dispersant may be configured to quickly and uniformly disperse the plant extract in the PET melt, to prevent agglomeration of the plant extract. The issues of the formation of a cross-linked three-degree polymer due to a high temperature in a local region of the PET melt may be prevented. The cross-linked three-degree polymer may cause the color of the melt to darken, and may cause the melt to be changed from liquid to colloidal. Further, the mechanical properties of the spun fiber may be affected, and the spun fiber may have non-uniform color with dark spots.

The protective agent may include nano-carbon powder and cross-linked chitosan porous microspheres in a mass ratio of approximately 1:(1-4). The cross-linked chitosan porous microspheres may be obtained according to the following steps.

Chitosan may be dissolved in an acetic acid solution with a mass concentration of approximately 2%-5%, and the acetic acid solution may stand still to remove bubbles to obtain a uniform and transparent chitosan solution. A mass ratio of chitosan and the acetic acid solution may be approximately 1:(95-100).

An emulsifier may be added to the liquid paraffin and nano-silica, and then may be fully stirred to obtain an emulsified dispersant. A mass ratio of liquid paraffin, nano-silica and emulsifier may be approximately (50-60):(2-5): 1.

Under stirring condition, the chitosan solution may be added dropwise to the emulsified dispersant, and then may be heated to approximately 40° C.-50° C. After being uniformly mixed, formaldehyde may be added. The pH value of the reaction system may be adjusted to be approximately 4-5, and the reaction system may be maintained at the reaction temperature for approximately 2 hours-3 hours. After the reaction ends, the product may be water-washed, soaked with 20%-30% sodium hydroxide solution, and then water-washed to obtain the cross-linked chitosan porous microspheres.

The mass ratio of chitosan solution, emulsified dispersant and formaldehyde may be approximately 100:(50-55):(4-8).

The cross-linked chitosan porous microspheres may be formed by a conventional inverse emulsion cross-linking method. The chitosan acetic acid solution may be added to the emulsified dispersant, and the nano-silica may be fully dispersed around the chitosan molecules by mechanical stirring. Then, cross-linking agent may be added. The chitosan may be cross-linked into a ball by adjusting the pH condition. Nano-silica particles may be loaded during the reaction process. Because the nano-silica particles occupy a certain position on the chitosan microspheres and the nano-silica particles are uniform, after the cross-linking is completed, the nano-silica may be removed by the sodium hydroxide solution to obtain the cross-linked chitosan porous microspheres, which may have uniform micro-pores. The plant extract may be filled in the micro-pores, and the plant extract may be prevented from being carbonized after being added into the melt.

The protective agent may be configured to prevent the carbonization of plant extract. Because the nano-carbon powder and cross-linked chitosan microspheres have many micro-pores on the surface, the plant extract may be coated in the micro-pore, and may be prevented from being carbonized. The protective agent and the plant extract may be first uniformly mixed, and then added into the melt, such that the plant extract may fully enter the micro-pores of the protective agent, and may be effectively prevented from being carbonized.

The modifier may include ethylene bis-stearamide and silicone oil in a mass ratio of approximately 1:(3-5). The addition of modifier may improve the peelability of the melt, may prevent the sticking-to-plate phenomenon of the melt after being extruded from the spinneret due to the occurrence of the expansion region, and may ensure the normal production and the quality of the spinning process.

Step 2: the ordinary PET chips and plant-based functional polyester masterbatch may be uniformly mixed, and may be melted by a screw extrusion. The melt may be extruded from a spinning nozzle to obtain the plant-based functional polyester filament. A diameter of the spinning nozzle may often be approximately 5 μm-50 μm. A mass ratio of the ordinary PET chips and the plant-based functional polyester masterbatch may be approximately (2-50): 1. The ordinary PET chips and the plant-based functional polyester masterbatch may be mixed and spun, while ensuring the effective content of the plant extract in the plant-based functional polyester filament, the production of plant-based functional polyester masterbatch may be reduced, and production efficiency may be improved.

Exemplary Embodiment 1

The present disclosure provides a plant-based functional polyester filament. The plant-based functional polyester filament may contain 0.1% (weight percentage) plant extract.

Exemplary Embodiment 2

The present disclosure provides a plant-based functional polyester filament. The plant-based functional polyester filament may contain 1.5% (weight percentage) plant extract.

Exemplary Embodiment 3

The present disclosure provides a plant-based functional polyester filament. The plant-based functional polyester filament may contain 0.5% (weight percentage) plant extract.

Exemplary Embodiment 4

The present disclosure provides a plant-based functional polyester filament. The plant-based functional polyester filament may contain 1.0% (weight percentage) plant extract.

Exemplary Embodiment 5

The present disclosure provides a plant-based functional polyester filament. The plant-based functional polyester filament may contain 1.2% (weight percentage) plant extract.

Exemplary Embodiment 6

The present disclosure provides a method for preparing a plant-based functional polyester filament. The preparation method may include following.

Step 1: preparation of a plant-based functional polyester masterbatch. PET chips may be heated to a temperature of approximately 250° C.-260° C. Antioxidant and dispersant may be added to the molten PET, and then the molten PET may be stirred at a speed of approximately 500 rad/min for approximately 10 minutes. Protective agent and plant extract may then be added to the molten PET, and then the molten PET may be stirred at a high speed for approximately 20 minutes. Modifier may be added to the molten PET, and then the molten PET may be stirred to obtain a mixture and cooled to a temperature of approximately 230° C. Ultimately, an extrusion granulation process may be performed on the mixture to obtain the plant-based functional polyester masterbatch.

A mass ratio of the PET chips, antioxidant, dispersant, protective agent, plant extract and modifier may be approximately 100:0.1:0.1:0.4:0.5:0.1. The antioxidant may include tert-butyl hydroquinone and zinc powder in a mass ratio of approximately 1:2. The dispersant may include sodium tripolyphosphate, ethylenediaminetetraacetic acid and sodium pyrophosphate in a mass ratio of approximately 1:1:2. The protective agent may include nano-carbon powder and cross-linked chitosan porous microspheres in a mass ratio of approximately 1:1.

The cross-linked chitosan porous microspheres may be obtained according to the following steps. Chitosan may be dissolved in an acetic acid solution with a mass concentration of approximately 2%, and the acetic acid solution may stand still to remove bubbles to obtain a uniform and transparent chitosan solution. A mass ratio of chitosan and acetic acid solution may be approximately 1:95.

An emulsifier may be added to the liquid paraffin and nano-silica, and then may be fully stirred to obtain an emulsified dispersant. A mass ratio of liquid paraffin, nano-silica and emulsifier may be approximately 50:2:1.

Under stirring condition, the chitosan solution may be added dropwise to the emulsified dispersant, and then may be heated to approximately 40° C. After being uniformly mixed, formaldehyde may be added. The pH value of the reaction system may be adjusted to be approximately 4, and the reaction system may be maintained at the reaction temperature for approximately 2 hours. After the reaction ends, the product may be water-washed, soaked with approximately 20% sodium hydroxide solution, and then water-washed to obtain the cross-linked chitosan porous microspheres.

A mass ratio of chitosan solution, emulsified dispersant and formaldehyde may be approximately 100:50:4. The modifier may include ethylene bis-stearamide and silicone oil in a mass ratio of approximately 1:3.

Step 2: the ordinary PET chips and plant-based functional polyester masterbatch with a mass ratio of approximately 4:1 may be uniformly mixed, and may be melted by a screw extrusion. The melt may be extruded from a spinning nozzle to obtain the plant-based functional polyester filament containing 0.1% (weight percentage) plant extract.

Exemplary Embodiment 7

The present disclosure provides a method for preparing a plant-based functional polyester filament. The preparation method may include following.

Step 1: preparation of a plant-based functional polyester masterbatch. PET chips may be heated to a temperature of approximately 250° C.-260° C. Antioxidant and dispersant may be added to the molten PET, and then the molten PET may be stirred at a speed of approximately 700 rad/min for approximately 15 minutes. Protective agent and plant extract may then be added to the molten PET, and then the molten PET may be stirred at a high speed for approximately 40 minutes. Modifier may be added to the molten PET, and then the molten PET may be stirred to obtain a mixture and cooled to a temperature of approximately 220° C. Ultimately, an extrusion granulation process may be performed on the mixture to obtain the plant-based functional polyester masterbatch.

A mass ratio of the PET chips, antioxidant, dispersant, protective agent, plant extract and modifier may be approximately 100:0.5:0.3:0.4:5:0.4. The antioxidant may include tert-butyl hydroquinone and zinc powder in a mass ratio of approximately 1:5. The dispersant may include sodium tripolyphosphate, ethylenediaminetetraacetic acid and sodium pyrophosphate in a mass ratio of approximately 1:4:4. The protective agent may include nano-carbon powder and cross-linked chitosan porous microspheres in a mass ratio of approximately 1:4.

The cross-linked chitosan porous microspheres may be obtained according to the following steps. Chitosan may be dissolved in an acetic acid solution with a mass concentration of approximately 5%, and the acetic acid solution may stand still to remove bubbles to obtain a uniform and transparent chitosan solution. A mass ratio of chitosan and acetic acid solution may be approximately 1:100.

An emulsifier may be added to the liquid paraffin and nano-silica, and then may be fully stirred to obtain an emulsified dispersant. A mass ratio of liquid paraffin, nano-silica and emulsifier may be approximately 60:5:1.

Under stirring condition, the chitosan solution may be added dropwise to the emulsified dispersant, and then may be heated to approximately 50° C. After being uniformly mixed, formaldehyde may be added. The pH value of the reaction system may be adjusted to be approximately 5, and the reaction system may be maintained at the reaction temperature for approximately 3 hours. After the reaction ends, the product may be water-washed, soaked with 30% sodium hydroxide solution, and then water-washed to obtain the cross-linked chitosan porous microspheres.

A mass ratio of chitosan solution, emulsified dispersant and formaldehyde may be approximately 100:55:8. The modifier may include ethylene bis-stearamide and silicone oil in a mass ratio of approximately 1:5.

Step 2: the ordinary PET chips and plant-based functional polyester masterbatch with a mass ratio of approximately 4:1 may be uniformly mixed, and may be melted by a screw extrusion. The melt may be extruded from a spinning nozzle to obtain the plant-based functional polyester filament containing 1.0% (weight percentage) plant extract.

Exemplary Embodiment 8

The present disclosure provides a method for preparing a plant-based functional polyester filament. The preparation method may include following.

Step 1: preparation of a plant-based functional polyester masterbatch. PET chips may be heated to a temperature of approximately 250° C.-260° C. Antioxidant and dispersant may be added to the molten PET, and then the molten PET may be stirred at a speed of approximately 600 rad/min for approximately 12 minutes. Protective agent and plant extract may then be added to the molten PET, and then the molten PET may be stirred at a high speed for approximately 30 minutes. Modifier may be added to the molten PET, and then the molten PET may be stirred to obtain a mixture and cooled to a temperature of approximately 225° C. Ultimately, an extrusion granulation process may be performed on the mixture to obtain the plant-based functional polyester masterbatch.

A mass ratio of the PET chips, antioxidant, dispersant, protective agent, plant extract and modifier may be approximately 100:0.2:0.2:0.5:4.5:0.2. The antioxidant may include tert-butyl hydroquinone and zinc powder in a mass ratio of approximately 1:3. The dispersant may include sodium tripolyphosphate, ethylenediaminetetraacetic acid and sodium pyrophosphate in a mass ratio of approximately 1:2:3. The protective agent may include nano-carbon powder and cross-linked chitosan porous microspheres in a mass ratio of approximately 1:2.

The cross-linked chitosan porous microspheres may be obtained according to the following steps. Chitosan may be dissolved in an acetic acid solution with a mass concentration of approximately 3%, and the acetic acid solution may stand still to remove bubbles to obtain a uniform and transparent chitosan solution. A mass ratio of chitosan and acetic acid solution may be approximately 1:96.

An emulsifier may be added to the liquid paraffin and nano-silica, and then may be fully stirred to obtain an emulsified dispersant. A mass ratio of liquid paraffin, nano-silica and emulsifier may be approximately 56:4:1.

Under stirring condition, the chitosan solution may be added dropwise to the emulsified dispersant, and then may be heated to approximately 45° C. After being uniformly mixed, formaldehyde may be added. The pH value of the reaction system may be adjusted to be approximately 4.5, and the reaction system may be maintained at the reaction temperature for approximately 2.5 hours. After the reaction ends, the product may be water-washed, soaked with 24% sodium hydroxide solution, and then water-washed to obtain the cross-linked chitosan porous microspheres.

A mass ratio of chitosan solution, emulsified dispersant and formaldehyde may be approximately 100:52:6. The modifier may include ethylene bis-stearamide and silicone oil in a mass ratio of approximately 1:4.

Step 2: the ordinary PET chips and plant-based functional polyester masterbatch with a mass ratio of approximately 2:1 may be uniformly mixed, and may be melted by a screw extrusion. The melt may be extruded from a spinning nozzle to obtain the plant-based functional polyester filament containing 1.5% (weight percentage) plant extract.

Exemplary Embodiment 9

The present disclosure provides a method for preparing a plant-based functional polyester filament. The preparation method may include following.

Step 1: preparation of a plant-based functional polyester masterbatch. PET chips may be heated to a temperature of approximately 250° C.-260° C. Antioxidant and dispersant may be added to the molten PET, and then the molten PET may be stirred at a speed of approximately 550 rad/min for approximately 14 minutes. Protective agent and plant extract may then be added to the molten PET, and then the molten PET may be stirred at a high speed for approximately 25 minutes. Modifier may be added to the molten PET, and then the molten PET may be stirred to obtain a mixture and cooled to a temperature of approximately 225° C. Ultimately, an extrusion granulation process may be performed on the mixture to obtain the plant-based functional polyester masterbatch.

A mass ratio of the PET chips, antioxidant, dispersant, protective agent, plant extract and modifier may be approximately 100:0.4:0.15:0.5:4:0.3. The antioxidant may include tert-butyl hydroquinone and zinc powder in a mass ratio of approximately 1:4. The dispersant may include sodium tripolyphosphate, ethylenediaminetetraacetic acid and sodium pyrophosphate in a mass ratio of approximately 1:3:2.5. The protective agent may include nano-carbon powder and cross-linked chitosan porous microspheres in a mass ratio of approximately 1:3.

The cross-linked chitosan porous microspheres may be obtained according to the following steps. Chitosan may be dissolved in an acetic acid solution with a mass concentration of approximately 4%, and the acetic acid solution may stand still to remove bubbles to obtain a uniform and transparent chitosan solution. A mass ratio of chitosan and acetic acid solution may be approximately 1:98.

An emulsifier may be added to the liquid paraffin and nano-silica, and then may be fully stirred to obtain an emulsified dispersant. A mass ratio of liquid paraffin, nano-silica and emulsifier may be approximately 58:4:1.

Under stirring condition, the chitosan solution may be added dropwise to the emulsified dispersant, and then may be heated to approximately 48° C. After being uniformly mixed, formaldehyde may be added. The pH value of the reaction system may be adjusted to be approximately 4.5, and the reaction system may be maintained at the reaction temperature for approximately 2 hours. After the reaction ends, the product may be water-washed, soaked with 28% sodium hydroxide solution, and then water-washed to obtain the cross-linked chitosan porous microspheres.

A mass ratio of chitosan solution, emulsified dispersant and formaldehyde may be approximately 100:54:5. The modifier may include ethylene bis-stearamide and silicone oil in a mass ratio of approximately 1:3.5.

Step 2: the ordinary PET chips and plant-based functional polyester masterbatch with a mass ratio of approximately 7:1 may be uniformly mixed, and may be melted by a screw extrusion. The melt may be extruded from a spinning nozzle to obtain the plant-based functional polyester filament containing 0.5% (weight percentage) plant extract.

The plant extract contained in the plant-based functional polyester filament in Embodiments 1-9 may include one or more of a peppermint extract, a valerian extract, a lavender extract, a wormwood extract and a seaweed extract.

The detection indexes of the plant-based functional polyester filament containing the plant extract prepared in Embodiments 6-9 of the present disclosure may be shown in Table 1. The antibacterial rate may be tested by the method of GB/T20944.3-2008 textile antibacterial performance. The test standard for mite repellent rate may be evaluated by GB/T24253-2009 textile mite removal performance.

TABLE 1

Test data table of plant-based functional polyester filament prepared in Embodiments 6-9

|  | Embodiment 6 | Embodiment 7 | Embodiment 8 | Embodiment 9 |
| --- | --- | --- | --- | --- |
| Breaking strength (cN/dtex) | 7.8 | 7.0 | 6.8 | 7.5 |
| Elastic modulus (cN/dtex) | 101 | 94 | 90 | 98 |
| Elongation at break/% | 18 | 14 | 12 | 16 |
| 2000-times wear loss/g | <0.001 | <0.001 | <0.001 | <0.001 |
| mite removal rate/% | 90.1 | 95.8 | 98.4 | 92.2 |
| Antibacterial rate of *Escherichia coli*/% | 98.5 | 99.1 | 99.9 | 99.0 |
| Antibacterial rate of *Staphylococcus aureus*/% | 98.2 | 98.9 | 99.5 | 98.6 |

According to the data in Table 1, each indicator of the plant-based functional polyester filament containing the plant extract in the present disclosure may reach the normal indicator required by the polyester fiber. The plant-based functional polyester filament may have substantially suitable breaking strength in a range of approximately 6.8 cN/dtex-7.8 cN/dtex, elastic modulus in a range of approximately 90 cN/dtex-101 cN/dtex, and elongation at break in a range of approximately 12%-18%. The plant-based functional polyester filament may have substantially high and stable wear resistance, and the 2000-times wear loss tested by the wear-resistance reciprocating testing machine may be less than 0.001 g. Due to the addition of the plant extract, the plant-based functional polyester filament containing the plant extract in the present disclosure may also have anti-bacterial and anti-mite functions, the mite removal rate may be greater than 90%, and the antibacterial rates of *Escherichia coli* and *Staphylococcus aureus* may be greater than 98%.

To compare the effects of antioxidant, dispersant, protective agent, and modifier in the process, comparative embodiments may be designed on the basis of Embodiment 7.

Comparative Embodiment 1

Comparative Embodiment 1 for preparing a plant-based functional polyester filament may be based on the above described exemplary Embodiment 7, except that the process of adding antioxidant may be omitted, while other processes may be the same as or similar with the processes in the exemplary Embodiment 7.

Comparative Embodiment 2

Comparative Embodiment 2 for preparing a plant-based functional polyester filament may be based on the above described exemplary Embodiment 7, except that the process of adding dispersant may be omitted, while other processes may be the same as or similar with the processes in the exemplary Embodiment 7.

Comparative Embodiment 3

Comparative Embodiment 3 for preparing a plant-based functional polyester filament may be based on the above described exemplary Embodiment 7, except that the process of adding protective agent may be omitted, while other processes may be the same as or similar with the processes in the exemplary Embodiment 7.

Comparative Embodiment 4

Comparative Embodiment 4 for preparing a plant-based functional polyester filament may be based on the above described exemplary Embodiment 7, except that the process of adding modifier may be omitted, while other processes may be the same as or similar with the processes in the exemplary Embodiment 7.

The testing data of the plant-based functional polyester filament prepared in comparative Embodiments 1-4 and the production process condition thereof may be shown in Table 2.

TABLE 2

Test data of the plant-based functional polyester filament prepared in comparative Embodiments 1-4

|  | Embodiment 7 | Comparative Embodiment 1 | Comparative Embodiment 2 | Comparative Embodiment 3 | Comparative Embodiment 4 |
|---|---|---|---|---|---|
| Breaking strength (cN/dtex) | 7.0 | 7.0 | 6.8 | 7.0 | 7.0 |
| Elastic modulus (cN/dtex) | 94 | 93 | 92 | 94 | 94 |
| Elongation at break/% | 14 | 14 | 12 | 14 | 13 |
| 2000-times wear loss/g | <0.001 | 0.001 | 0.002 | <0.001 | <0.001 |
| mite removal rate/% | 95.8 | 95.0 | 95.8 | 75 | 95.8 |
| Antibacterial rate of *Escherichia coli*/% | 99.1 | 99.0 | 99.1 | 82 | 99.0 |
| Antibacterial rate of *Staphylococcus aureus*/% | 98.9 | 98.6 | 98.9 | 80 | 98.9 |
| Degree of coloring | Uniform | Pattern | Non-uniform color, with dark spots | Uniform | Uniform |

According to Table 2, because the antioxidant is not added in comparative Embodiment 1, although the plant-based functional polyester filament in comparative Embodiment 1 has similar breaking strength, elastic modulus, elongation at break and wear-resistance as the plant-based functional polyester filament in Embodiment 7, the plant extract may change color at a high temperature, the coloring phenomenon may appear, and the antibacterial performance of the plant extract may be reduced.

In comparative Embodiment 2, because dispersant is not added, although the antibacterial and anti-mite performance is not affected, due to the agglomeration of the plant extract, a cross-linked three-degree polymer may be formed due to a high temperature in a local region of the PET melt. The cross-linked three-degree polymer may cause the color of the melt to darken, and may cause the melt to be changed from liquid to colloidal. Further, the mechanical properties of the spun fiber may be affected, and the spun fiber may have non-uniform color with dark spots.

In comparative Embodiment 3, because protective agent is not added, although the plant-based functional polyester filament in comparative Embodiment 3 has similar breaking strength, elastic modulus, elongation at break and wear-resistance as the plant-based functional polyester filament in Embodiment 7, in other words, the mechanical performance of the fiber is not affected, the antibacterial and anti-mite performance of the spun fiber may be substantially reduced. This may be because the added plant extract is carbonized, and the plant extract is not fully and smoothly added to the PET melt.

The plant-based functional polyester filament in comparative Embodiment 4 may have similar test data as in Embodiment 7, while the peelability of the melt in the production process may be substantially poor, and the melt may tend to stick to the plate after being spun. To smooth the spinning, silicone oil may need to be continuously sprayed on the surface of the spinneret. However, the amount of sprayed silicone oil may not be easily controlled. The spinneret surface may tend to get dirty due to too large amount of sprayed silicone oil, which may affect the quality of the fiber. The fiber may tend to stick to the plate due to too small amount of sprayed silicone oil, and the production process may need to repeatedly stop for cleaning the spinneret.

Because in the wear-resistance test of the plant-based functional polyester filament prepared in Embodiments 6-9, the 2000-times wear loss tested by the wear-resistance reciprocating testing machine is less than 0.001 g, the wear-resistance performance may be desired, and the electrostatic phenomenon may not occur during the test process. The plant-based functional polyester filament prepared in Embodiments 6-9 may be spun into fabric using an existing method, and the anti-static performance thereof may be tested according to standard of GB 12014-2009 anti-static clothing. The point-to-point resistance and charged amount data of the fabric may be shown in Table 3.

TABLE 3

Anti-static test results of fabric made of the plant-based functional polyester filament prepared in Embodiments 6-9

| | Point-to-point resistance/Ω | Charged amount/μC/m² |
|---|---|---|
| Embodiment 6 | $3.5 \times 10^6$ | 0.09 |
| Embodiment 7 | $5.0 \times 10^6$ | 0.14 |
| Embodiment 8 | $5.2 \times 10^6$ | 0.18 |
| Embodiment 9 | $4.6 \times 10^6$ | 0.12 |

According to Table 3, the plant-based functional polyester filament prepared in Embodiments 6-9 may have the point-to-point resistance and charged amount data reached the standard of Class A anti-static clothing, and may be non-pilling, non-static and non-dust-sticking.

The disclosed embodiments may have following beneficial effects. The plant-based functional polyester filament may have both functions of substantially high mechanical strength of polyester fiber and antibacterial performance of the plant extract. The plant-based functional polyester filament may be featured with desired antibacterial deodorization, desired wear-resistance, high elasticity, comfortable hand feeling, non-pilling and non-dust-sticking. The plant-based functional polyester filament may have substantially suitable breaking strength in a range of approximately 6.8 cN/dtex-7.8 cN/dtex, elastic modulus in a range of approximately 90 cN/dtex-101 cN/dtex, and elongation at break in a range of approximately 12%-18%. The plant-based functional polyester filament may have substantially high and stable wear resistance, and the 2000-times wear loss tested by the wear-resistance reciprocating testing machine may be less than 0.001 g. The plant-based functional polyester filament in the present disclosure may also have antibacterial and anti-mite functions, the mite removal rate may be greater than 90%, and the antibacterial rates of *Escherichia coli* and *Staphylococcus aureus* may be greater than 98%.

The fabric made of the plant-based functional polyester filament in the present disclosure may have the point-to-point resistance and charged amount data reached the standard of Class A anti-static clothing, and may be non-pilling, non-static and non-dust-sticking, which may effectively solve the problem of existing polyester fiber such as pilling, carrying static electricity and dust-sticking, and may expand the application range of polyester fiber.

In the preparation method of the plant-based functional polyester filament in the present disclosure, due to the addition of the antioxidant, the plant extract may be prevented from changing color when being added to the melt at a high-temperature. The antioxidant may be added in an initial stage, which may make the molten PET fiber have substantially strong oxidation-resistance. When the plant extract is added in a later stage, the plant extract may be effectively prevented from changing color at a high temperature, and the occurrence of coloring may be prevented.

In the preparation method of the plant-based functional polyester filament in the present disclosure, due to the addition of the dispersant, the dispersant may be configured to quickly and uniformly disperse the plant extract in the PET melt, to prevent agglomeration of the plant extract. The issues of the formation of a cross-linked three-degree polymer due to a high temperature in a local region of the PET melt may be prevented. The cross-linked three-degree polymer may cause the color of the melt to darken, and may cause the melt to be changed from liquid to colloidal.

In the preparation method of the plant-based functional polyester filament in the present disclosure, the protective agent may include nano-carbon powder and cross-linked chitosan porous microspheres. Because the nano-carbon powder and cross-linked chitosan microspheres have many micro-pores on the surface, the plant extract may be coated in the micro-pore, and may be prevented from being carbonized. The protective agent and the plant extract may be first uniformly mixed, and then added into the melt, such that the plant extract may fully enter the micro-pores of the protective agent, and may be effectively prevented from being carbonized.

In the preparation method of the plant-based functional polyester filament in the present disclosure, the addition of modifier may improve the peelability of the melt, may prevent the sticking-to-plate phenomenon of the melt after being extruded from the spinneret due to the occurrence of the expansion region, and may ensure the normal production and the quality of the spinning process.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A preparation method of a plant-based functional polyester filament, comprising:
   preparing a plant-based functional polyester masterbatch, including:
   heating polyethylene terephthalate (PET) chips to a molten state at a temperature of approximately 250° C.-260° C.,
   adding an antioxidant and a dispersant to the molten PET, and stirring the molten PET at a speed of approximately 500 rad/min-700 rad/min for approximately 10 minutes-15 minutes, adding a protective agent and a plant extract to the molten PET, and stirring the molten PET at a high speed for approximately 20 minutes-40 minutes, adding a modifier to the molten PET, obtaining a mixture by uniformly mixing the molten PET and cooling to a temperature of approximately 220° C.-230° C., and performing an extrusion granulation process on the mixture to obtain the plant-based functional polyester masterbatch.

2. The method according to claim 1, wherein:

a mass ratio of the PET chips, the antioxidant, the dispersant, the protective agent, the plant extract and the modifier is approximately 100:(0.1-0.5):(0.1-0.3):(0.4-0.8):(0.5-5):(0.1-0.4).

3. A preparation method of a plant-based functional polyester filament, comprising:

preparing a plant-based functional polyester masterbatch, including:

heating polyethylene terephthalate (PET) chips to a molten state, adding an antioxidant and a dispersant to the molten PET, and stirring the molten PET, adding a protective agent and a plant extract to the molten PET, and stirring the molten PET at a high speed, adding a modifier to the molten PET, obtaining a mixture by uniformly mixing the molten PET, and performing an extrusion granulation process on the mixture, wherein:

the antioxidant includes tert-butyl hydroquinone and zinc powder in a mass ratio of approximately 1:(2-5).

4. The method according to claim 1, wherein:

the dispersant includes sodium tripolyphosphate, ethylenediaminetetraacetic acid and sodium pyrophosphate in a mass ratio of approximately 1:(1-4):(2-4).

5. A preparation method of a plant-based functional polyester filament, comprising:

preparing a plant-based functional polyester masterbatch, including:

heating polyethylene terephthalate (PET) chips to a molten state, adding an antioxidant and a dispersant to the molten PET, and stirring the molten PET, adding a protective agent and a plant extract to the molten PET, and stirring the molten PET at a high speed, adding a modifier to the molten PET, obtaining a mixture by uniformly mixing the molten PET, and performing an extrusion granulation process on the mixture, wherein:

the protective agent includes nano-carbon powder and cross-linked chitosan porous microspheres in a mass ratio of approximately 1:(1-4).

6. The method according to claim 5, wherein forming the cross-linked chitosan porous microspheres includes:

dissolving chitosan in an acetic acid solution with a mass concentration of approximately 2%-5%, and removing bubbles by standing still to obtain a uniform and transparent chitosan solution, wherein a mass ratio of the chitosan and the acetic acid solution is approximately 1:(95-100), adding an emulsifier to liquid paraffin and nano-silica, and obtaining an emulsified dispersant by fully stirring, wherein a mass ratio of the liquid paraffin, the nano-silica and the emulsifier is approximately (50-60):(2-5):1, and under stirring condition, dropwise adding the chitosan solution to the emulsified dispersant, heating to a temperature of approximately 40° C.-50° C., after being uniformly mixed adding formaldehyde, adjusting a pH value of a reaction system to be approximately 4-5, and maintaining at a reaction temperature for approximately 2 hours-3 hours, after the reaction ends, water-washing the product, soaking the product with 20%-30% sodium hydroxide solution, and water-washing the product to obtain the cross-linked chitosan porous microspheres, wherein:

a mass ratio of the chitosan solution, the emulsified dispersant and the formaldehyde is approximately 100:(50-55):(4-8).

7. The method according to claim 1, wherein:

the modifier includes ethylene bis-stearamide and silicone oil in a mass ratio of approximately 1:(3-5).

8. The method according to claim 1, further including:

uniformly mixing the PET chips and the plant-based functional polyester masterbatch, melting the PET chips and plant-based functional polyester masterbatch by a screw extrusion, and extruding the melt from a spinning nozzle to obtain the plant-based functional polyester filament.

9. The method according to claim 8, wherein:

a mass ratio of the PET chips and the plant-based functional polyester masterbatch is in a range of approximately (2-50):1.

10. The method according to claim 8, wherein:

a diameter of the spinning nozzle is approximately 5 μm-50 μm.

11. The method according to claim 1, wherein:

breaking strength of the plant-based functional polyester filament is in a range of approximately 6.8 cN/dtex-7.8 cN/dtex, elastic modulus of the plant-based functional polyester filament is in a range of approximately 90 cN/dtex-101 cN/dtex, and elongation at break of the plant-based functional polyester filament is in a range of approximately 12%-18%.

12. The method according to claim 1, wherein:

2000-times wear loss of the plant-based functional polyester filament is less than 0.001 g.

13. The method according to claim 1, wherein:

a mite removal rate of the plant-based functional polyester filament is greater than 90%, and antibacterial rates of *Escherichia coli* and *Staphylococcus aureus* of the plant-based functional polyester filament are greater than 98%.

14. The method according to claim 1, wherein:

the plant extract includes one or more of a peppermint extract, a valerian extract, a lavender extract, a wormwood extract, a chitin extract and a seaweed extract.

15. The method according to claim 1, wherein:

the antioxidant includes tert-butyl hydroquinone and zinc powder in a mass ratio of approximately 1:(2-5), and the protective agent includes nano-carbon powder and cross-linked chitosan porous microspheres in a mass ratio of approximately 1:(1-4).

16. The method according to claim 3, wherein:

the plant extract includes one or more of a peppermint extract, a valerian extract, a lavender extract, a wormwood extract, a chitin extract and a seaweed extract.

17. The method according to claim 3, further including:

uniformly mixing the PET chips and the plant-based functional polyester masterbatch, melting the PET chips and plant-based functional polyester masterbatch by a screw extrusion, and extruding the melt from a spinning nozzle to obtain the plant-based functional polyester filament, wherein:

a mass ratio of the PET chips and the plant-based functional polyester masterbatch is in a range of approximately (2-50): 1.

18. The method according to claim 5, wherein:

the plant extract includes one or more of a peppermint extract, a valerian extract, a lavender extract, a wormwood extract, a chitin extract and a seaweed extract.

19. The method according to claim 5, further including:

uniformly mixing the PET chips and the plant-based functional polyester masterbatch, melting the PET chips and plant-based functional polyester masterbatch by a screw extrusion, and extruding the melt from a spinning nozzle to obtain the plant-based functional polyester filament, wherein:

a mass ratio of the PET chips and the plant-based functional polyester masterbatch is in a range of approximately (2-50): 1.

* * * * *